(12) United States Patent
Botero

(10) Patent No.: US 10,831,731 B2
(45) Date of Patent: Nov. 10, 2020

(54) METHOD FOR STORING AND ACCESSING DATA INTO AN INDEXED KEY/VALUE PAIR FOR OFFLINE ACCESS

(71) Applicant: Dell Products L.P., Round Rock, TX (US)

(72) Inventor: Luis J. Botero, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 613 days.

(21) Appl. No.: 14/205,595

(22) Filed: Mar. 12, 2014

(65) Prior Publication Data

US 2015/0261800 A1 Sep. 17, 2015

(51) Int. Cl.
| | | |
|---|---|---|
| G06F 16/00 | (2019.01) | |
| G06F 16/22 | (2019.01) | |
| G06F 16/27 | (2019.01) | |
| G06F 16/23 | (2019.01) | |

(52) U.S. Cl.
CPC .......... G06F 16/22 (2019.01); G06F 16/2372 (2019.01); G06F 16/27 (2019.01)

(58) Field of Classification Search
CPC .......... G06F 16/10; G06F 16/18; G06F 16/22; G06F 16/23; G06F 16/27; G06F 16/58; G06F 16/90; G06F 16/164; G06F 16/178; G06F 16/583; G06F 16/958; G06F 16/2372

See application file for complete search history.

(56) References Cited

U.S. PATENT DOCUMENTS

| | | | | |
|---|---|---|---|---|
| 7,370,066 B1 * | 5/2008 | Sikchi | ..................... | G06F 16/10 707/698 |
| 7,680,831 B1 * | 3/2010 | Gandhi | ............... | H04L 41/0654 707/999.2 |
| 8,321,873 B2 * | 11/2012 | Shao | ........................ | H04L 43/50 707/600 |
| 8,700,804 B1 * | 4/2014 | Meyers | ............... | H04L 67/1095 709/217 |

(Continued)

OTHER PUBLICATIONS

P. Zhou, Mobile Offline Framework for Azure, http://www.slideshare.net/PeterOBlenis/offline-azureandroid-share, downloaded Oct. 21, 2014.

(Continued)

*Primary Examiner* — Ashish Thomas
*Assistant Examiner* — Rezwanul Mahmood
(74) *Attorney, Agent, or Firm* — Terrile, Cannatti & Chambers; Stephen A. Terrile

(57) ABSTRACT

A system, method, and computer-readable medium are disclosed for managing the storage, access and synchronization of offline data. A set of online data, which is available for online access, is persisted as a set of offline data in a local storage associated with a user device and a key-value pair is used to cross-reference the first set of online data and the first set of offline data. An access request for a set of data, corresponding to the first set of online data, is received from a user device application. The access request is then processed to determine whether the first set of online data is available for online access. If it is, then the first set of online data is provided to the user device application for processing. Otherwise, the first set of offline data is provided to the user device application for processing.

18 Claims, 5 Drawing Sheets

| Key | 302 | Data | 308 |
|---|---|---|---|
| auth | 304 | Authentication Token | 310 |
| [data_type]_[uniqe-id] 306 (i.e., account_0001) | | Data Container | 312 |

| Header | 314 | record_id: (String) data_type: (String) keep_offline: [true/false] needs_sync: [true/false] last_change: (date time) |
|---|---|---|
| Body | 316 | (Data) |

(56) References Cited

U.S. PATENT DOCUMENTS

| | | | | |
|---|---|---|---|---|
| 8,789,208 B1* | 7/2014 | Sundaram | H04L 29/06 | 726/29 |
| 8,793,531 B2* | 7/2014 | George | G06F 3/0613 | 714/6.3 |
| 8,944,920 B1* | 2/2015 | Munson | H04L 12/1822 | 463/42 |
| 8,949,781 B1* | 2/2015 | Orcutt | G06F 8/34 | 717/109 |
| 9,071,569 B1* | 6/2015 | Jacobs | H04L 63/102 | |
| 9,143,410 B1* | 9/2015 | Radhakrishnan | H04L 43/00 | |
| 9,258,579 B1* | 2/2016 | Reeves | H04N 21/23439 | |
| 9,552,334 B1* | 1/2017 | Meisels | G06F 40/295 | |
| 10,254,996 B1* | 4/2019 | Jain | G06F 3/0647 | |
| 2002/0165875 A1* | 11/2002 | Verta | G06F 19/327 | 715/213 |
| 2004/0003003 A1* | 1/2004 | McCartney | G06F 16/2372 | 707/999.2 |
| 2005/0091576 A1* | 4/2005 | Relyea | G06F 9/451 | 715/211 |
| 2005/0091672 A1* | 4/2005 | Debique | G06F 8/20 | 719/328 |
| 2005/0160063 A1* | 7/2005 | Pan | H04L 67/1006 | 707/999.001 |
| 2007/0088732 A1* | 4/2007 | Chen | G06F 16/24534 | 707/999.101 |
| 2007/0130262 A1* | 6/2007 | Williams | H04L 51/066 | 709/206 |
| 2009/0043867 A1* | 2/2009 | Sharp | G06F 16/27 | 709/218 |
| 2009/0198805 A1* | 8/2009 | Ben-Shaul | G06F 9/4416 | 709/222 |
| 2009/0228606 A1* | 9/2009 | McCarthy | H04L 67/1097 | 709/248 |
| 2010/0030791 A1* | 2/2010 | Iverson | G06F 16/1737 | 713/320 |
| 2010/0235623 A1* | 9/2010 | Simpson | G06F 21/40 | 713/155 |
| 2010/0293598 A1* | 11/2010 | Collart | H04N 21/64753 | 726/3 |
| 2010/0306368 A1* | 12/2010 | Gagliardi | H04L 43/045 | 709/224 |
| 2010/0313205 A1* | 12/2010 | Shao | H04L 43/50 | 718/105 |
| 2011/0191169 A1* | 8/2011 | Cui | G06Q 30/0247 | 705/14.46 |
| 2011/0191170 A1* | 8/2011 | Zhang | G06Q 30/0247 | 705/14.46 |
| 2011/0258225 A1* | 10/2011 | Taylor | G06F 16/2272 | 707/769 |
| 2011/0276744 A1* | 11/2011 | Sengupta | G06F 12/0246 | 711/103 |
| 2011/0307736 A1* | 12/2011 | George | G06F 3/067 | 714/6.2 |
| 2011/0314043 A1* | 12/2011 | Bernstein | G06F 17/30914 | 707/769 |
| 2012/0290427 A1* | 11/2012 | Reed | G06Q 50/01 | 705/26.2 |
| 2012/0330908 A1* | 12/2012 | Stowe | G06F 16/248 | 707/693 |
| 2013/0036117 A1* | 2/2013 | Fisher | G06F 16/487 | 707/736 |
| 2013/0103729 A1* | 4/2013 | Cooney | G06F 16/24568 | 707/831 |
| 2013/0196600 A1* | 8/2013 | Capers | H04W 24/06 | 455/41.2 |
| 2013/0297887 A1* | 11/2013 | Woodward | G06F 16/172 | 711/137 |
| 2013/0339372 A1* | 12/2013 | Adayikkoth | G06F 16/90 | 707/748 |
| 2014/0012949 A1* | 1/2014 | Meyers | H04L 67/1095 | 709/217 |
| 2014/0089253 A1* | 3/2014 | Mansur | G06F 16/213 | 707/609 |
| 2014/0101093 A1* | 4/2014 | Lanphear | G06F 16/254 | 707/602 |
| 2014/0129457 A1* | 5/2014 | Peeler | G06Q 10/067 | 705/317 |
| 2014/0181021 A1* | 6/2014 | Montulli | G06F 16/178 | 707/624 |
| 2014/0181027 A1* | 6/2014 | Whitehead | G06F 11/14 | 707/639 |
| 2014/0181034 A1* | 6/2014 | Harrison | G06F 16/27 | 707/646 |
| 2014/0181039 A1* | 6/2014 | Harrison | G06F 16/164 | 707/652 |
| 2014/0195321 A1* | 7/2014 | Hubbard | G06Q 30/0225 | 705/14.26 |
| 2014/0200988 A1* | 7/2014 | Kassko | G06Q 30/0242 | 705/14.41 |
| 2014/0201485 A1* | 7/2014 | Ahn | G06F 3/065 | 711/162 |
| 2014/0280522 A1* | 9/2014 | Watte | H04L 51/18 | 709/203 |
| 2014/0280766 A1* | 9/2014 | Banerjee | G06F 9/466 | 709/219 |
| 2014/0281214 A1* | 9/2014 | Rehm | G06F 3/0689 | 711/112 |
| 2014/0337459 A1* | 11/2014 | Kuang | H04L 67/2842 | 709/213 |
| 2015/0074407 A1* | 3/2015 | Palmeri | H04L 63/0823 | 713/171 |
| 2015/0088924 A1* | 3/2015 | Abadi | G06F 16/90335 | 707/769 |
| 2015/0160862 A1* | 6/2015 | Blott | G06F 12/00 | 711/148 |
| 2015/0234884 A1* | 8/2015 | Henriksen | G06F 16/951 | 707/623 |
| 2015/0261800 A1* | 9/2015 | Botero | G06F 16/22 | 707/610 |
| 2015/0350321 A1* | 12/2015 | Klose | H04L 67/1074 | 709/217 |
| 2016/0048849 A1* | 2/2016 | Shiftan | G06Q 50/01 | 705/7.29 |
| 2016/0099849 A1* | 4/2016 | Batla | H04L 67/125 | 709/203 |
| 2018/0181604 A1* | 6/2018 | Marohn | G06F 16/2264 | |
| 2019/0079831 A1* | 3/2019 | Madduri | G06F 16/273 | |
| 2020/0125450 A1* | 4/2020 | Aron | G06F 16/13 | |

OTHER PUBLICATIONS

Microsoft Sync Framework Database Synchronization (http://msdn.microsoft.com/en-us/sync/bb887608.aspx), downloaded Oct. 21, 2014.

JayData (http://jaydata.org), downloaded Oct. 21, 2014.

* cited by examiner

METHOD FOR STORING AND ACCESSING DATA INTO AN INDEXED KEY/VALUE PAIR FOR OFFLINE ACCESS

BACKGROUND OF THE INVENTION

Field of the Invention

The present invention relates to the management of information handling systems. More specifically, embodiments of the invention provide a system, method, and computer-readable medium for managing the storage, access and synchronization of offline data.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years it has become increasingly popular to use a Wi-Fi or mobile broadband (e.g., 3G, LTE, etc.) network to remotely access information handling systems and the data they contain. However, despite the growing ubiquity of access points to these networks, connectivity is not always available. For example, a mobile device user may be on a long flight, riding through a subway tunnel, or camping in a national park. Nonetheless, these users often need to access data that is typically stored online, such as certain forms of electronic publications (e.g., "e-books") or games.

Offline data access is not a new concept and typical implementations include duplicating data structures found in remote backend systems. However, these solutions cannot be easily ported over to other data sources. Furthermore, many online data sources are based on relational databases where data is structured. As a result, there is currently no generic approach to replicating database schemas and content on mobile applications such that it can be accessed when network connectivity is unavailable.

SUMMARY OF THE INVENTION

A system, method, and computer-readable medium are disclosed for managing the storage, access and synchronization of offline data. In various embodiments, a first set of online data, which is available for online access, is persisted as a first set of offline data in a local storage associated with a user device. In these embodiments, a key-value pair is used to cross-reference the first set of online data and the first set of offline data.

In one embodiment, an access request for a set of data, corresponding to the first set of online data, is received from a user device application. The access request is then processed to determine whether the first set of online data is available for online access. If it is, then the first set of online data is provided to the user device application for processing. However, if it is not, then the first set of offline data is provided to the user device application for processing.

In another embodiment, the first set of offline data is retrieved from the local storage associated with the user device and compared to the first set of online data to see if it is different. If so, synchronization operations are performed to synchronize the first set of online data with the first set of offline data. In yet another embodiment, a second set of offline data is retrieved from the local storage associated with the user device and then processed to determine whether it is new. If so, then a copy of the second set of offline data is persisted as a second set of online data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for managing the storage, access and synchronization of offline data. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (IO) devices, such as a keyboard, a mouse, and a video display. The information handling system may also include one or more buses operable to transmit communications between the various hardware components.

Figure 1:
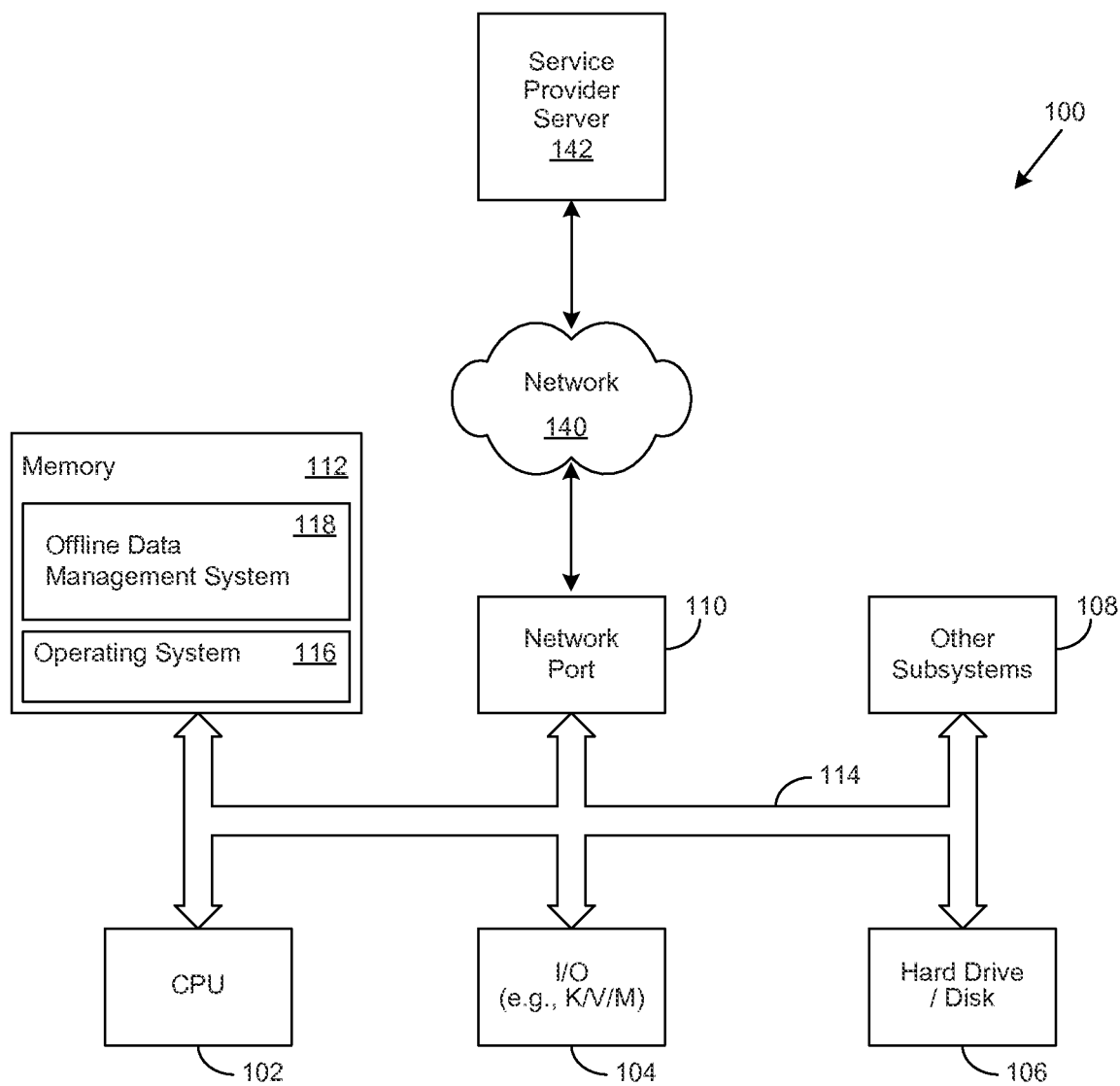
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142, The information handling system 100 likewise includes system memory 112, which is interconnected to the foregoing via one or more buses 114. System memory 112 further comprises operating system (OS) 116 and in various embodiments may also comprise an offline data management system 118. In one embodiment, the information handling system 100 is able to download the offline data management system 118 from the service provider server 142. In another embodiment, the offline data management system 118 is provided as a service from the service provider server 142.

Figure 2:
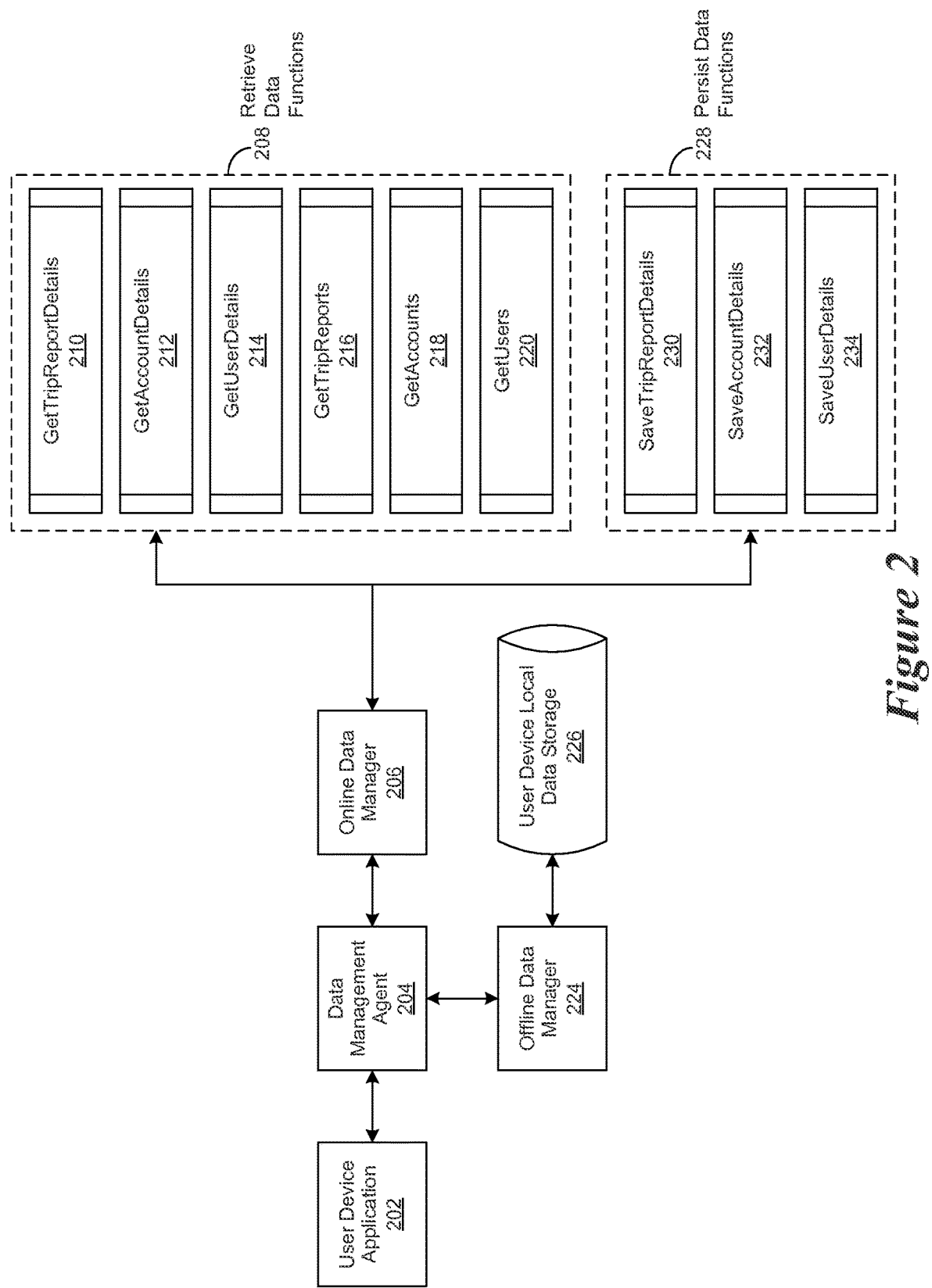
FIG. 2 is a simplified block diagram of an offline data management system for managing the storage, access and synchronization of online and offline data.

FIG. 2 is a simplified block diagram of an offline data management system implemented in accordance with an embodiment of the invention to manage the storage, access and synchronization of offline data. In various embodiments, as described in greater detail herein, a user device application 202 consumes and processes data that is typically stored online and accessed through the use of a network. In certain embodiments, predetermined sets of online data are persisted on the user's device for consumption and processing by the user device application 202 when access to a network is not available. In this embodiment, a data management agent 204 manages interactions between the user device application 202, an online data manager 206, and an offline data manager 224.

Referring to FIG. 2, offline data access and persistence operations are begun by monitoring operations being performed by the data management agent 204 to detect data access requests from the user device application 202. Once a data access request is received from the user device application 202, a determination is made by the online data manager 206 whether the requested data is available online. If so, then the online data manager 206 accesses a network and then uses predetermined "Retrieve Data" functions 208 to retrieve the requested data from its online storage location.

In various embodiments, the "Retrieve Data" functions 208 may include "GetTripReportDetails" 210, "GetAccountDetails" 212, "GetUserDetails" 214, "GetTripReports" 216, "GetAccounts" 218, and "GetUsers" 220. It will be appreciated that many such examples of "Retrieve Data" functions 208 are possible and the foregoing is not intended to limit the spirit, scope or intent of the invention. In one embodiment, serialized JavaScript Object Notation (JSON), an open standard format that uses human-readable text to transmit data objects consisting of attribute-value pairs, is implemented to retrieve the requested online data. In various embodiments, the requested online data is stored in Hypertext Markup Language version 5 (HTML5) format.

A determination is then made whether the retrieved data is marked as being available for offline access. If so, the retrieved data is then persisted by the offline data manager 224 in the user device's local data storage 226 as corresponding offline data. Once the retrieved data has been persisted in the user device's local data storage 226, it is then made available for consumption and processing by the user device application 202.

In various embodiments, offline data synchronization operations are initiated by the data management agent 204 once it is determined that access to a network is available. In this embodiment, the offline data manager 224 first retrieves a target set of offline data from the user device's local data storage 226. A determination is then made whether the retrieved set of offline data is either new or has been modified since the user device application 202 was last synchronized.

If it is determined that the retrieved set of offline data has been generated since the user device application 202 was last synchronized, then the online data manager 206 uses "Persist Data" functions 228 to persist the set of offline data as a corresponding set of online data. In various embodiments, the "Persist Data" functions 228 may include "SaveTripReportDetails" 230, "SaveAccountDetails" 232, and "SaveUserDetails" 234. It will be appreciated that many such examples of "Persist Data" functions 228 are possible and the foregoing is not intended to limit the spirit, scope or intent of the invention. The offline data manager 224 then updates the corresponding set of offline data stored in the user device's local data storage 226 to indicate that it has been persisted online.

However, if it is determined that the retrieved set of offline data is not new, then a search is performed by the online data manager 206 for a corresponding set of online data. In various embodiments, the search is performed using key-value-pairs, described in greater detail herein. The method by which the key-value-pairs are used to perform is a matter of design choice. If a corresponding set of online data is not found, then the offline data manager 224 updates the set of offline data stored in the user device's local data storage 226 to indicate that a corresponding set of online data was not found.

However, if a corresponding set of online data was found, then a determination is made in whether it is different or newer than the set of retrieved offline data. If not, then the online data manager 206 uses the retrieved set of offline data to update the corresponding set of online data. However, if it is determined that the corresponding set of online data is newer than the set of retrieved offline data, then the user is prompted for a predetermined action, such as whether to update or overwrite the set of online data. If so, then the corresponding set of online data is appropriately updated and the process is continued until all offline data stored in the user device's local data storage is synchronized with its corresponding online data.

Figure 3:
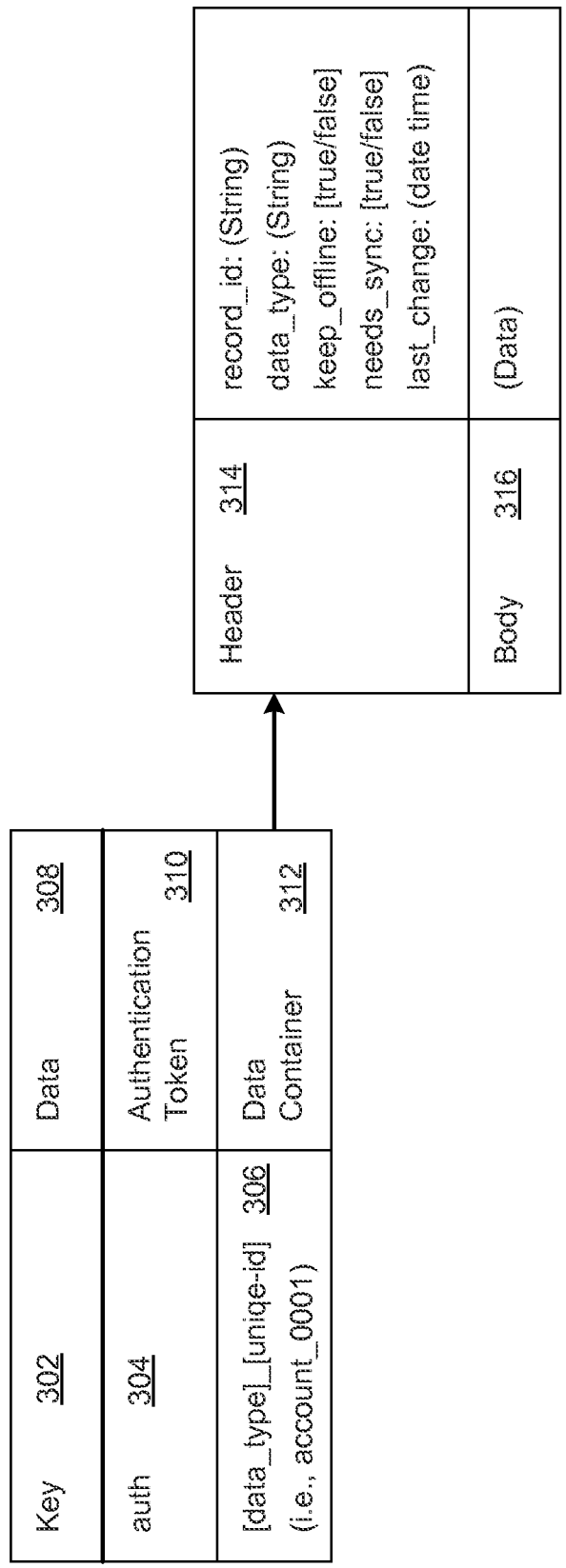
FIG. 3 is a simplified block diagram of a data model for managing the storage, access and synchronization of offline data.

FIG. 3 is a simplified block diagram of a data model implemented in accordance with an embodiment of the invention to manage the storage, access and synchronization of offline data. In various embodiments, the storage, access and synchronization of offline data, as described in greater detail herein, is performed through the implementation of key-value-pairs. In these embodiments, the key-value pairs are used to cross reference a set of online data with a corresponding set of offline data that is persisted in local storage associated with a user device.

These key-value pairs are based upon a provider model design pattern that utilizes an offline agent, such as the data management agent 204 shown in FIG. 2. Those of skill in the art will be familiar with the provider model design pattern, which allows an application, such as the user device application 202 shown in FIG. 2, to choose from one of multiple implementations of an application configuration. As an example, various implementations may provide access to different data stores to retrieve login information, or to use different storage methodologies, such as a database, binary to disk, Extensible Markup Language (XML), and so forth.

In various embodiments, the source provider of the data provider would provide the business logic that would decide when to use the offline agent (e.g., the data management agent 204 shown in FIG. 2) to store or retrieve data when access to a network is not available. In certain of these embodiments, the offline agent would use a key-value pair to store and manage individual sets of data as persisted data that is locally stored on the user's device. In various embodiments, such individual sets of data may include database records from a structured data source.

In certain embodiments, the keys 302 of a key-value pair are strings composed of the data provider unique name (e.g., DellMasterCustomerData), a data type 304 representing the origin or data category (e.g., 'auth' for authorization), and a unique identifier 306 (e.g., unique_id), Likewise, each of the keys 302 of a key-value pair correspond to associated data 308. For example, as shown in FIG. 3, the "auth" 304 key corresponds to an authentication token 310, while the "[data_type]_[unique_id]" 306 key corresponds to a data container 312.

In these embodiments, the values of a key-value pair are composed of a header 314, which is associated with the data container 312, and a body 316. In various embodiments, the header 314 contains metadata, such as "record_id," "data_type," "keep_offline" (e.g., if record needs to be kept offline, or not, once connectivity is achieved), "new_record" (e.g., if record is new or has any changes), and "last_change" for the last change date. In one embodiment, the "data_type" could include various data types, such as "account," "contact," "trip_report," "opportunity," or "activity." In certain embodiments, the body 316 contains a serialized version of the data as defined in the source database schema.

Figure 4:
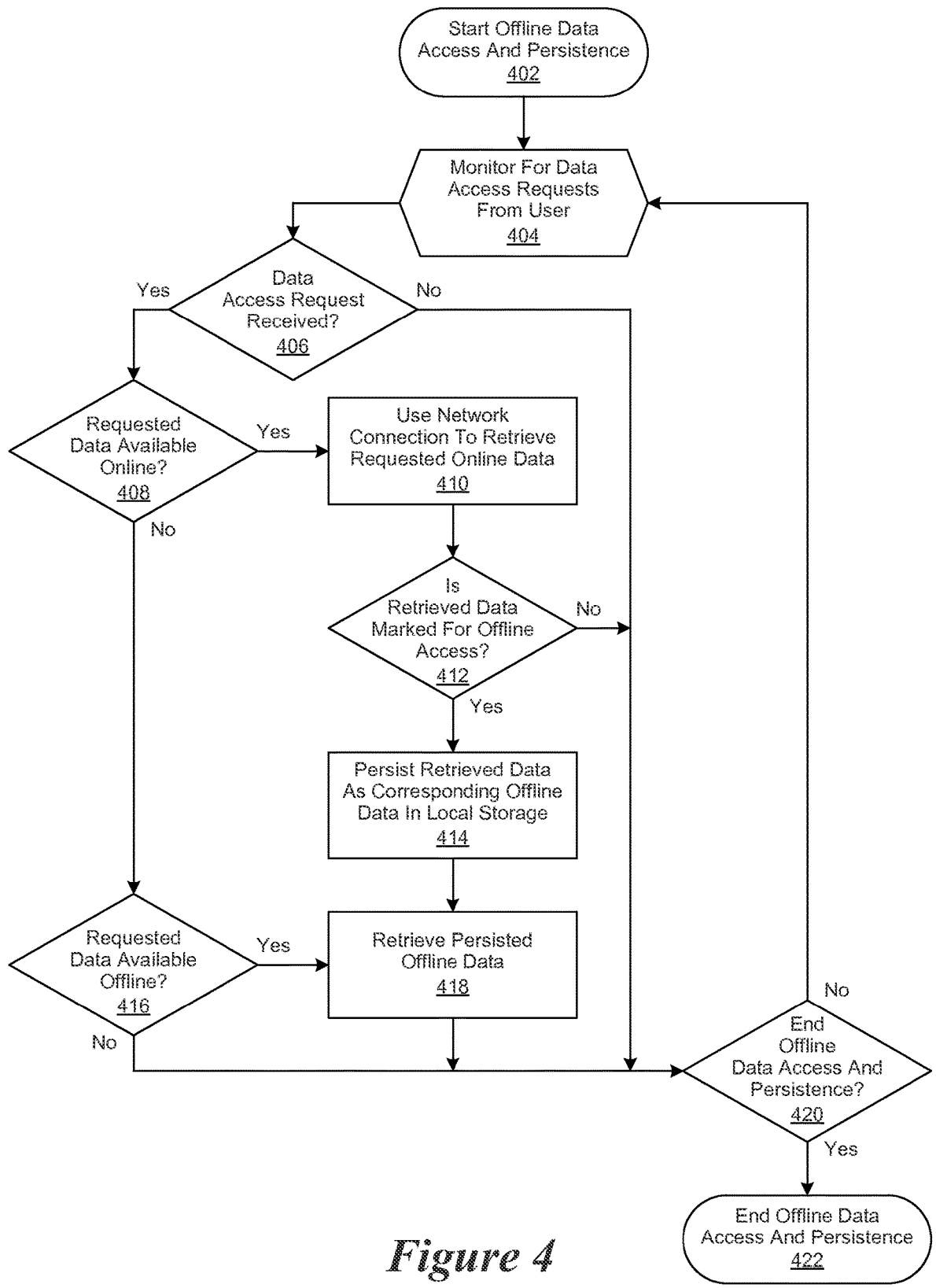
FIG. 4 is a generalized flowchart of the performance of offline data access and persistence operations.

FIG. 4 is a generalized flowchart of the performance of offline data access and persistence operations implemented in accordance with an embodiment of the invention. In this embodiment, offline data access and persistence operations are begun in step 402, followed by monitoring operations being performed in step 404 to detect data access requests from a user. A determination is then made in step 406 whether a data access request has been received from a user. If not, then a determination is made in step 420 whether to end offline data access and persistence operations. If not, then the process is continued, proceeding with step 404, Otherwise, offline data access and persistence operations are ended in step 422.

However, if it is determined in step 406 that a data access is request is received from a user, a determination is then made in step 408 whether the requested data is available online. If so, then a network is accessed in step 410 to retrieve the requested data from its online storage location. A determination is then made in step 412 whether the retrieved data is marked as being available for offline access. If not, then the process is continued, proceeding with step 420. Otherwise, the retrieved data is persisted in the user device's local data storage as corresponding offline data in step 414.

However, if it was determined in step 408 that the requested data was not available online, then a determination is made in step 416 whether the requested data is available for offline access. If not, then the process is continued, proceeding with step 420. Otherwise, once the retrieved data has been persisted in local storage in step 414, then the persisted data is retrieved for use in step 418 and the process is continued, proceeding with step 420.

Figure 5:
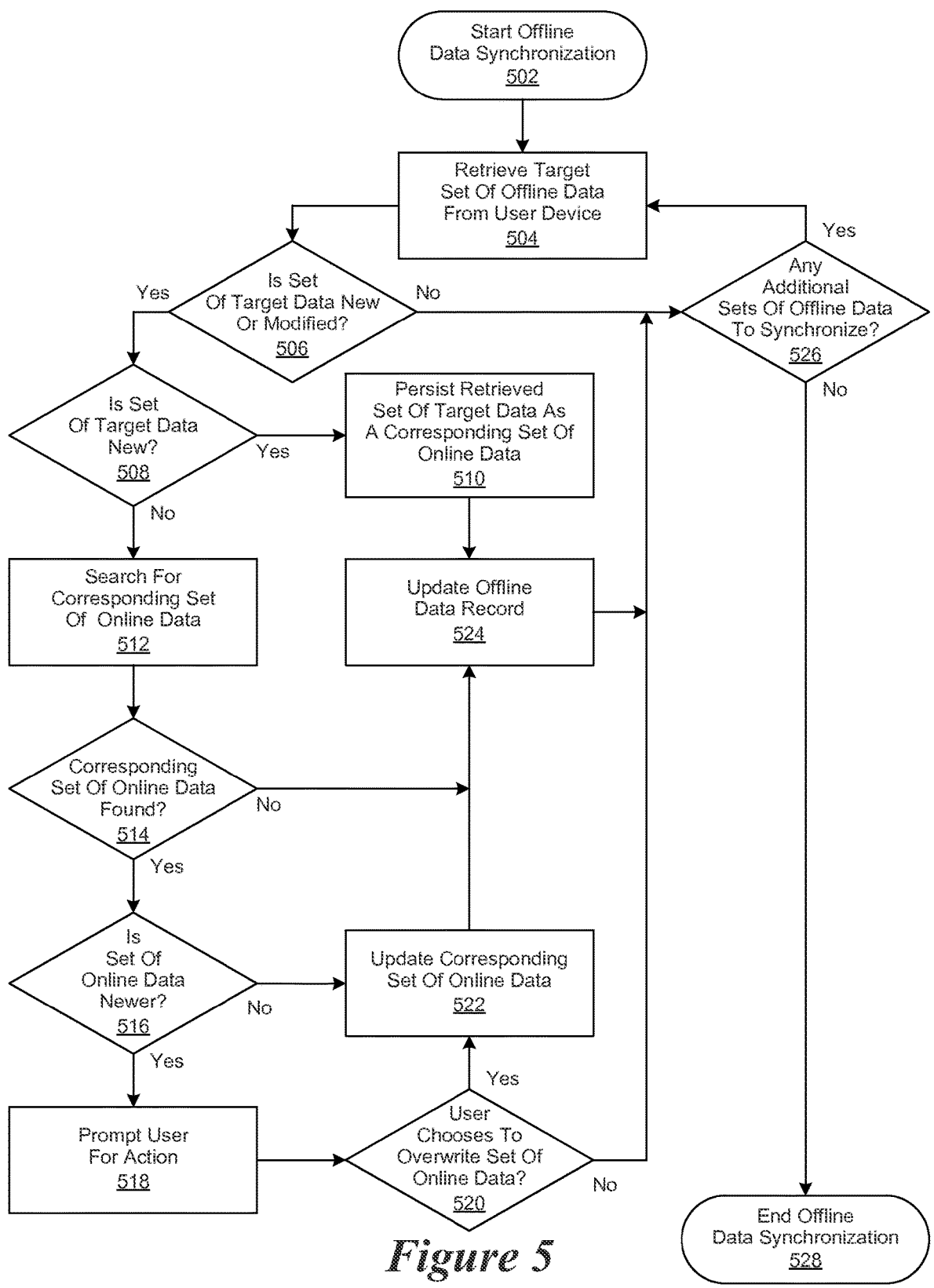
FIG. 5 is a generalized flowchart of the performance of offline data synchronization operations.

FIG. 5 is a generalized flowchart of the performance of offline data synchronization operations implemented in accordance with an embodiment of the invention. In this embodiment, offline data synchronization operations are begun in step 502, followed by the retrieval of a target set of offline data from a user device in step 504. A determination is then made in step 506 whether the retrieved set of offline data is either new or has been modified since the user device was last synchronized. If not, then a determination is made in step 526 whether there are any additional sets of offline data to synchronize. If not, then offline data synchronization operations are ended in step 528. Otherwise, the process is continued, proceeding with step 504.

However, if it is determined that the retrieved set of offline data has not been generated or modified since the user device was last synchronized, then a determination is made in step 508 whether the retrieved set of offline data is new. If so, then the retrieved set of offline data is persisted as a corresponding set of online data in step 510. The corresponding set of offline data is then updated on the user device in step 524 to indicate that it has been persisted online and the process is continued, proceeding with step 526.

However, if it is determined in step 508 that the retrieved set of offline data is not new, then a search is performed in step 512 for a corresponding set of online data, followed by a determination being made in step 514 whether a corresponding set of online data is found. If not, then the set of offline data is updated on the user device in step 524 to indicate that a corresponding set of online data was not found. The process is then continued, proceeding with step 526.

However, if it is determined in step 514 that a corresponding set of online data was found, then a determination is made in step 516 whether the corresponding set of online data is different or newer than the set of retrieved offline data. If not, then the corresponding set of online data is updated in step 522 with the set of retrieved set of offline data. The process is then continued, proceeding with step 524.

However, if it is determined in step 516 that the corresponding set of online data is newer than the set of retrieved offline data, then the user is prompted for a predetermined action, such as whether to update or overwrite the set of online data, in step 518. A determination is then made in step 520 whether the user elects to use the retrieved set of offline data to update or overwrite the corresponding set of online data. If so, then the corresponding set of online data is appropriately updated in step 522 and the process is continued as described in greater detail herein, proceeding with step 524. Otherwise, the process is continued, proceeding with step 526.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for managing offline data via an offline data management system, the offline data management system executing on a hardware processor of an information handling system, the offline data management system comprising a user device application, user device local data storage, a data management agent, an offline data manager, an online data manager, the online data manager accessing data from an online data source via a network, comprising:
    persisting a copy of a first set of online data received from the online data source via the online data manager as a first set of offline data in a local storage associated with a user device, the first set of online data available for online access, the first set of offline data being stored within the user device local data storage using the offline data manager; and
    using, via the data management agent, a key-value pair to cross-reference the first set of online data and the first set of offline data, the data management agent detecting data access requests from the user device application and managing interactions between the user device application, the offline data manager and the online data manager, each key-value pair comprising a key portion and a value portion,
        the key portion comprising a data type representing an origin or data category and a unique identifier, the key portion corresponding to associated data, the associated data comprising an authentication token corresponding to the data type and a data container corresponding to the unique identifier; and,
        the value portion comprising a header associated with the data container and a body, the header comprising metadata, the metadata comprising keep offline metadata indicating whether the offline data needs to be kept offline once connectivity is achieved, and the body comprising a serialized version of the offline data, the serialized version of the offline data being defined in a source database schema; and wherein
    a provider of the online data source determines when to use the data management agent to store or retrieve data when access to the network is not available.

2. The method of claim 1, further comprising:
receiving an access request for a set of data corresponding to the first set of online data;
processing the access request to determine if the first set of online data is available for online access; and
providing the first set of online data if it is available for online access.

3. The method of claim 2, further comprising:
providing the first set of offline data if the first set of online data is not available for online access.

4. The method of claim 3, further comprising:
retrieving the first set of offline data from the local storage; and
processing the first set of offline data and the first set of online data to determine if the first set of offline data is different than the first set of online data.

5. The method of claim 4, further comprising:
performing synchronization operations to synchronize the first set of online data with the first set of offline data.

6. The method of claim 3, further comprising:
retrieving a second set of offline data from the local storage;
processing the second set of offline data and the first set of online data to determine if the second set of offline data is new; and
persisting a copy of the second set of offline data as a second set of online data if it is.

7. A system comprising:
a hardware processor;
a data bus coupled to the processor; and
a non-transitory, computer-readable storage medium embodying computer program code, the non-transitory, computer-readable storage medium being coupled to the data bus, the computer program code interacting with a plurality of computer operations for managing offline data via an offline data management system, the offline data management system executing on the hardware processor of an information handling system, the offline data management system comprising a user device application, user device local data storage, an offline data manager, an online data manager, the online data manager accessing data from an online data source via a network and comprising instructions executable by the processor and configured for:
    persisting a copy of a first set of online data received from the online data source via the online data manager as a first set of offline data in a local storage associated with a user device, the first set of online data available for online access, the first set of offline data being stored within the user device local data storage using the offline data manager; and
    using, via the data management agent, a key-value pair to cross-reference the first set of online data and the first set of offline data, the data management agent detecting data access requests from the user device application and managing interactions between the user device application, the offline data manager and the online data manager, each key-value pair comprising a key portion and a value portion,
        the key portion comprising a data type representing an origin or data category and a unique identifier, the key portion corresponding to associated data, the associated data comprising an authentication token corresponding to the data type and a data container corresponding to the unique identifier; and,
        the value portion comprising a header associated with the data container and a body, the header comprising metadata, the metadata comprising keep offline metadata indicating whether the offline data needs to be kept offline once connectivity is achieved, and the body comprising a serialized version of the offline data, the serialized version of the offline data being defined in a source database schema; and wherein a provider of the online date data source determines when to use the data management agent to store or retrieve data when access to the network is not available.

8. The system of claim 7, further comprising:

receiving an access request for a set of data corresponding to the first set of online data;

processing the access request to determine if the first set of online data is available for online access; and providing the first set of online data if it is available for online access.

9. The system of claim 8, further comprising:

providing the first set of offline data if the first set of online data is not available for online access.

10. The system of claim 9, further comprising:

retrieving the first set of offline data from the local storage; and processing the first set of offline data and the first set of online data to determine if the first set of offline data is different than the first set of online data.

11. The system of claim 10, further comprising:

performing synchronization operations to synchronize the first set of online data with the first set of offline data.

12. The system of claim 9, further comprising:

retrieving a second set of offline data from the local storage;

processing the second set of offline data and the first set of online data to determine if the second set of offline data is new; and persisting a copy of the second set of offline data as a second set of online data if it is.

13. A non-transitory, computer-readable storage medium embodying computer program code for managing offline data via an offline data management system, the offline data management system executing on a hardware processor of an information handling system, the offline data management system comprising a user device application, user device local data storage, an offline data manager, an online data manager, the online data manager accessing data from an online data source via a network, the computer program code comprising computer executable instructions configured for:

persisting a copy of a first set of online data received from the online data source via the online data manager as a first set of offline data in a local storage associated with a user device, the first set of online data available for online access, the first set of offline data being stored within the user device local data storage using the offline data manager; and using, via the data management agent, a key-value pair to cross-reference the first set of online data and the first set of offline data, the data management agent detecting data access requests from the user device application and managing interactions between the user device application, the offline data manager and the online data manager, each key-value pair comprising a key portion and a value portion, the key portion comprising a data type representing an origin or data category and a unique identifier, the key portion corresponding to associated data, the associated data comprising an authentication token corresponding to the data type and a data container corresponding to the unique identifier; and, the value portion comprising a header associated with the data container and a body, the header comprising metadata, the metadata comprising keep offline metadata indicating whether the offline data needs to be kept offline once connectivity is achieved, and the body comprising a serialized version of the offline data, the serialized version of the offline data being defined in a source database schema; and wherein a provider of the online data source determines when to use the data management agent to store or retrieve data when access to the network is not available.

14. The non-transitory, computer-readable storage medium of claim 13, further comprising:

receiving an access request for a set of data corresponding to the first set of online data;

processing the access request to determine if the first set of online data is available for online access; and providing the first set of online data if it is available for online access.

15. The non-transitory, computer-readable storage medium of claim 14, further comprising:

providing the first set of offline data if the first set of online data is not available for online access.

16. The non-transitory, computer-readable storage medium of claim 15, further comprising:

retrieving the first set of offline data from the local storage; and processing the first set of offline data and the first set of online data to determine if the first set of offline data is different than the first set of online data.

17. The non-transitory, computer-readable storage medium of claim 16, further comprising:

performing synchronization operations to synchronize the first set of online data with the first set of offline data.

18. The non-transitory, computer-readable storage medium of claim 15, further comprising:

retrieving a second set of offline data from the local storage;

processing the second set of offline data and the first set of online data to determine if the second set of offline data is new; and persisting a copy of the second set of offline data as a second set of online data if it is.

* * * * *